Dec. 2, 1947.   G. F. DRAKE   2,431,687
MULTIPLE PRIME MOVER CONTROL AND SYNCHRONIZATION
Filed March 10, 1944   5 Sheets-Sheet 3
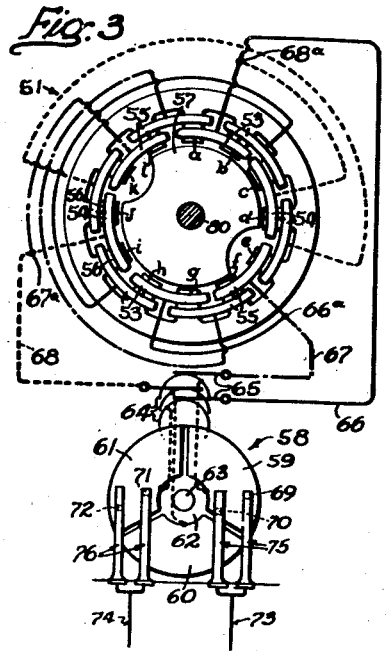
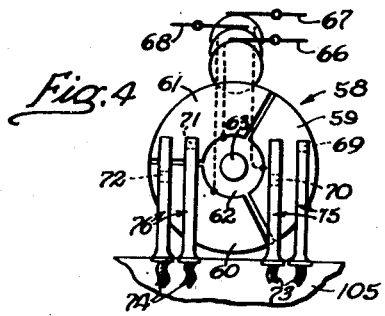
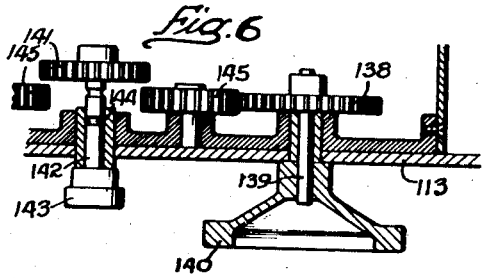
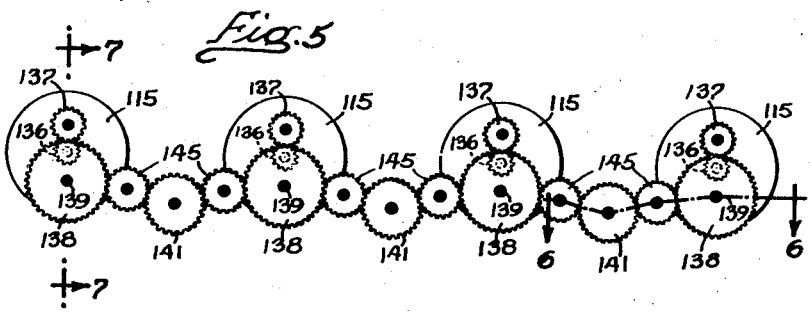
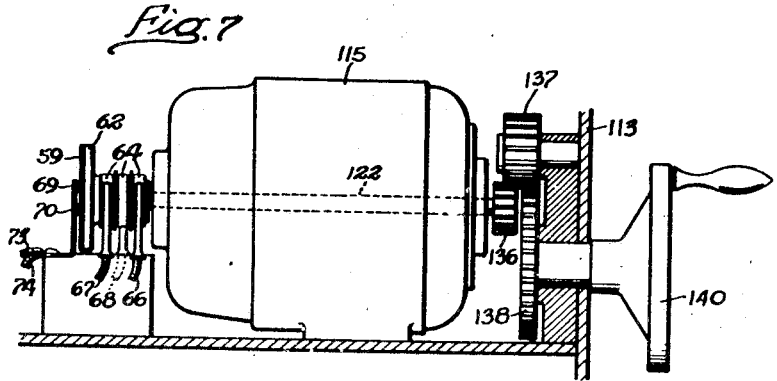
INVENTOR
George Forrest Drake
By Carlson, Pitzner & Hubbard & Wolfe
ATTORNEYS Dec. 2, 1947.  G. F. DRAKE  2,431,687

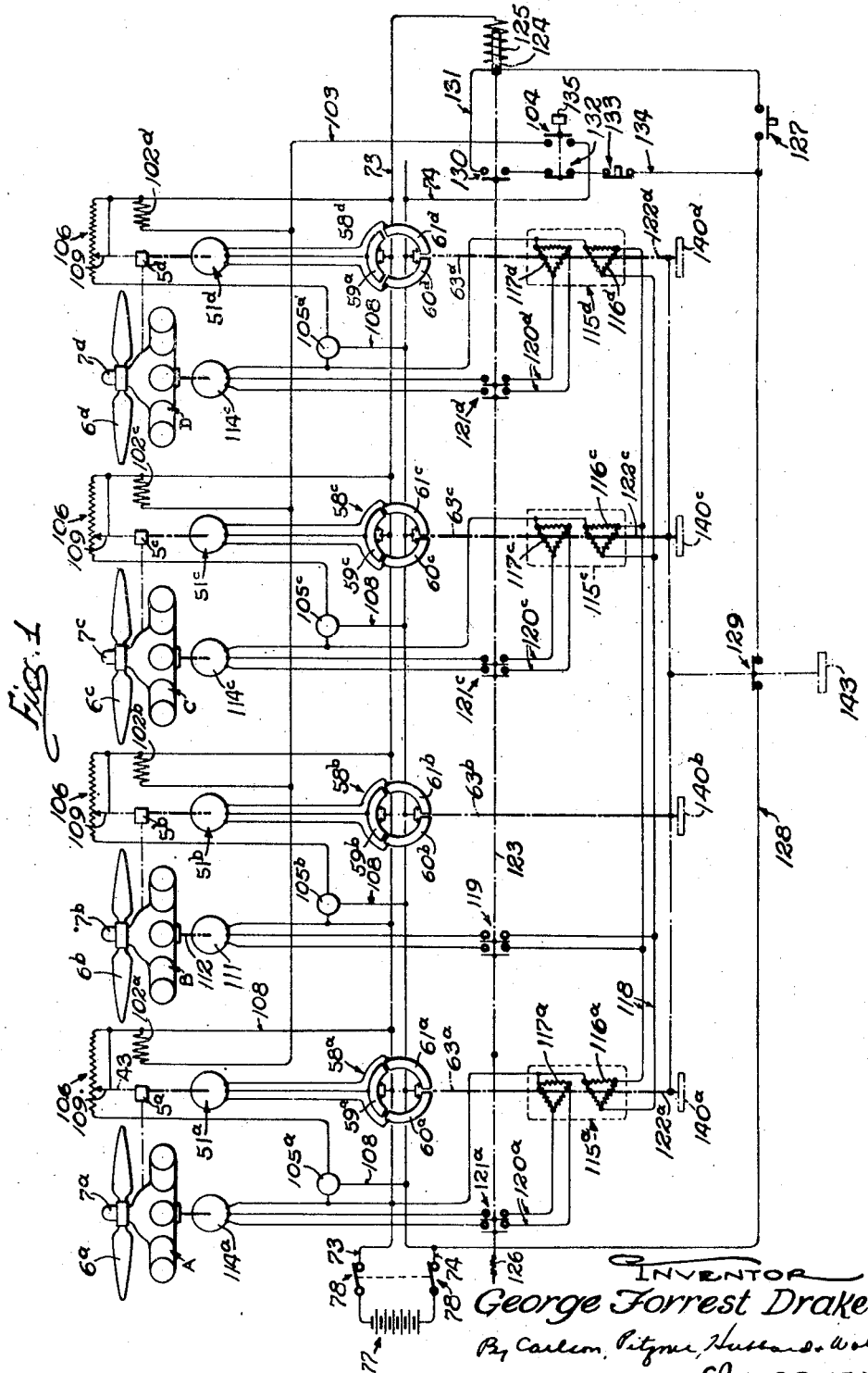

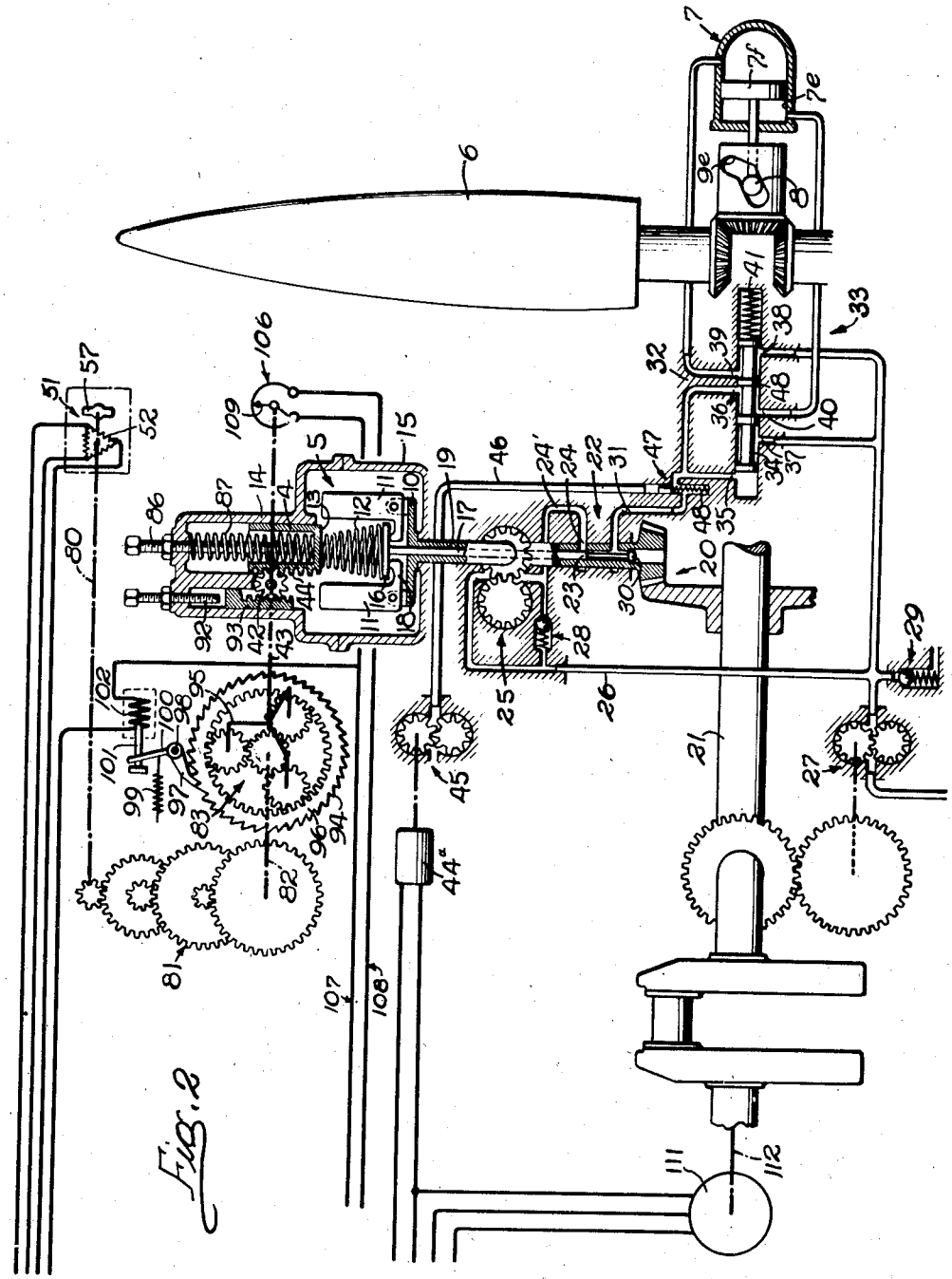

MULTIPLE PRIME MOVER CONTROL AND SYNCHRONIZATION

Filed March 10, 1944  5 Sheets-Sheet 5

INVENTOR
George Forrest Drake
By Carlson, Pitzner, Hubbard, Wolfe
ATTORNEYS

Patented Dec. 2, 1947

2,431,687

UNITED STATES PATENT OFFICE 2,431,687

MULTIPLE PRIME MOVER CONTROL AND SYNCHRONIZATION

George Forrest Drake, Rockford, Ill., assignor to Woodward Governor Company, Rockford, Ill., a corporation of Illinois Application March 10, 1944, Serial No. 525,913

18 Claims. (Cl. 60—97)

1

This invention relates to the remote control of the speeds of a number of power units such, for example, as internal combustion engines. In certain of its aspects, the invention has to do with systems in which the speeds of one or more units are matched against a reference or master speed which may be varied selectively.

The general object is to provide a novel remote control system which is especially adaptable to the control of mechanically separated power units, which permits of speed and other manual adjustments from a remote point of control, which is very light in weight, and which is simple in construction and reliable in operation.

A further object is to provide a control which avoids the use of relays, brushes, slip rings, contacts, or the like immediately associated with and subject to the vibration of the prime movers.

Another object is to provide apparatus of the above character in which the synchronizing control may be disabled and the speeds of the individual power units may be changed to a preselected value.

A further object is to provide an automatic synchronizing control part of which is utilized in a novel manner in adapting the controlled engines for manual speed adjustment either individually or as a group.

The invention also resides in the novel manner of applying the speed corrections and in the construction of the individual engine speed adjusters that permits of quick changes in the engine speed settings.

Other objects and advantages of the invention will become apparent from the following detailed description taken in connection with the accompanying drawings, in which Figure 1 is a schematic view and wiring diagram of one form of the improved control.

Fig. 2 is a schematic view showing the parts of one power unit and associated speed controller.

Fig. 3 is an elevational view of a step motor and its controlling switch used in effecting speed adjustment of the individual power units.

Fig. 4 is a view of the commutator switch shown in Fig. 3 with the parts disposed in a different position.

Fig. 5 is an elevational view of gearing forming part of the manually operable speed adjusting mechanism.

2

Fig. 6 is a fragmentary plan view taken substantially along the line 6—6 of Fig. 5.

Fig. 7 is a section taken along the line 7—7 of Fig. 5.

Figure 8:
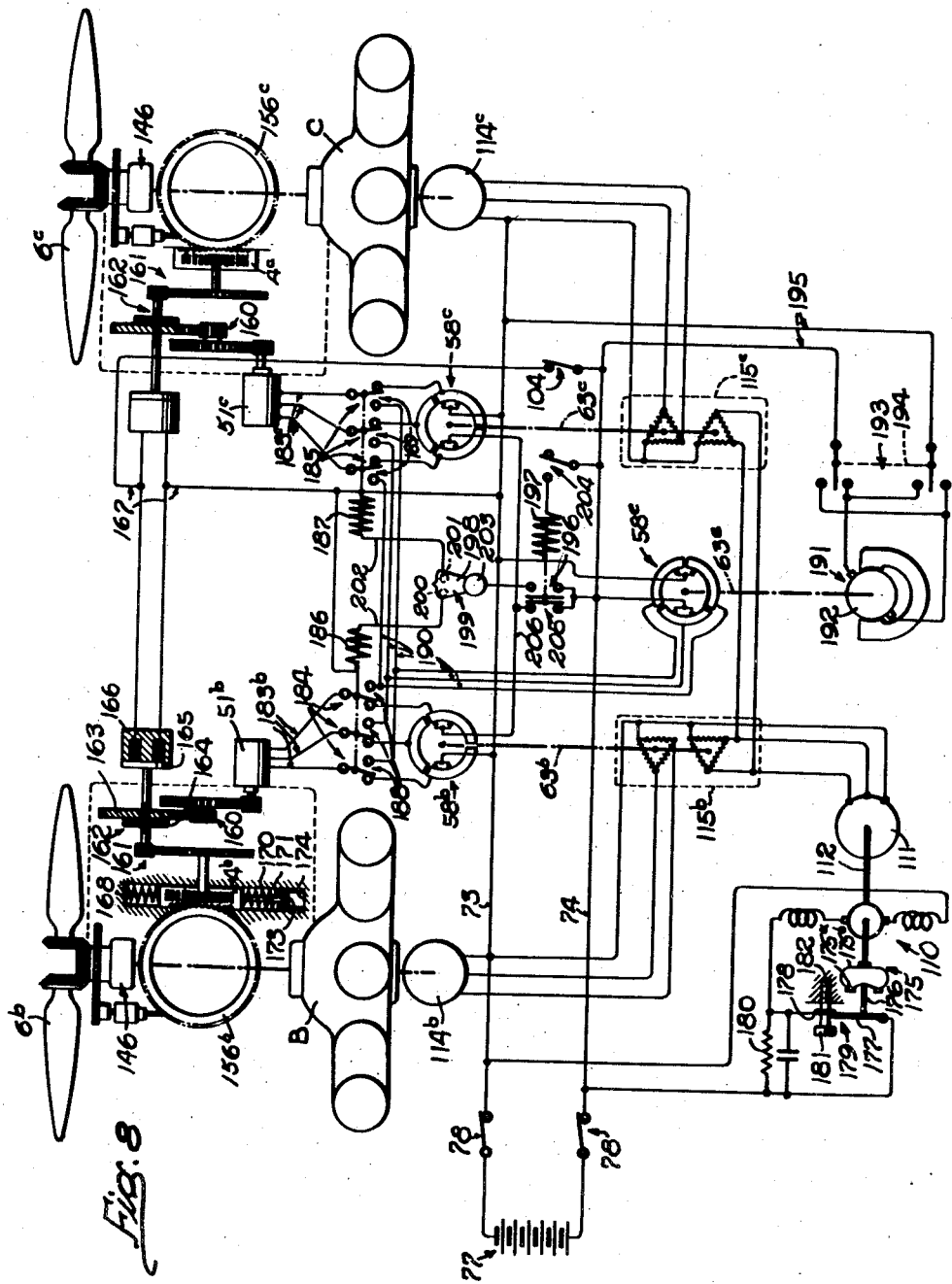

Fig. 8 is a schematic view and wiring diagram of a modified form of the control.

Figure 9:
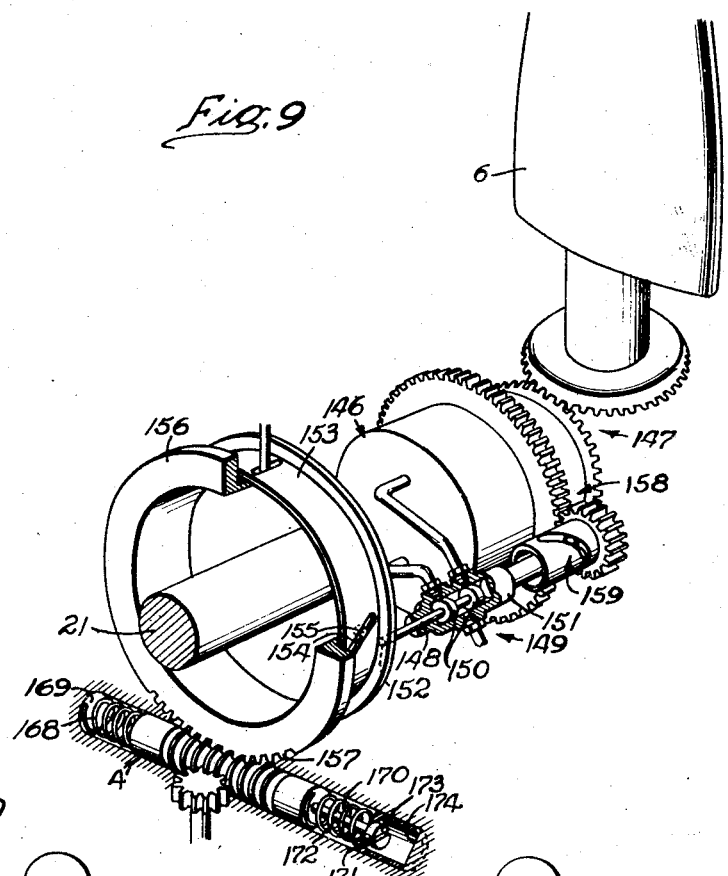

Fig. 9 is a fragmentary perspective view of the modified form of engine speed adjusting mechanism.

Figure 10:
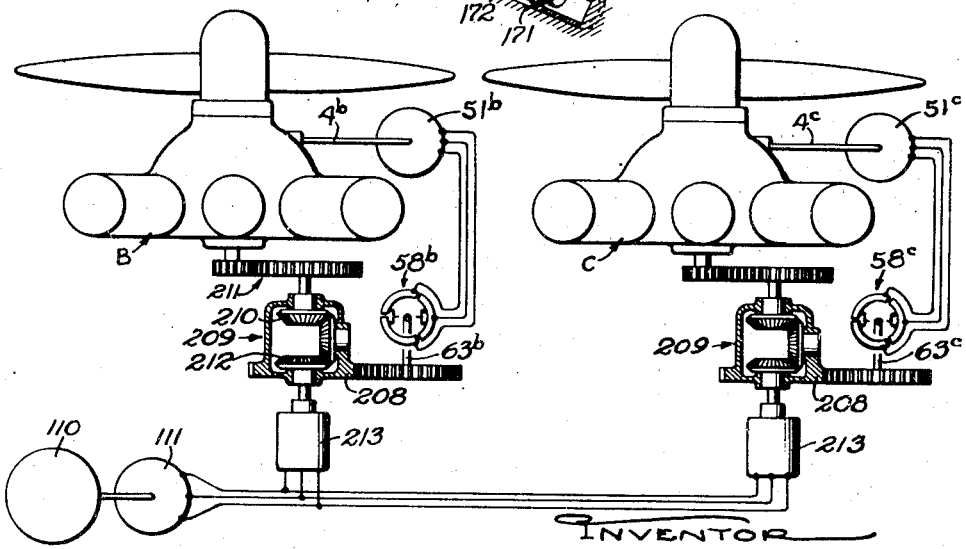

Fig. 10 is a partial schematic view and wiring diagram of another modification.

While the improved control system is applicable to the control of various kinds of multiple unit power generating systems under widely varying operating conditions, it has been shown in the drawings and will be described herein as applied to the remote control and synchronization of a group of internal combustion engines each of which drives the propeller 6 of a multi-engine airplane. It is to be understood, however, that I do not intend to limit the invention by such disclosure nor to the particular illustrated constructions of the various switch, speed adjuster, and motor units, but aim to cover all modifications, alternative constructions, and uses falling within the scope of the invention as expressed in the appended claims.

For convenience, the engines are designated as A, B, C, and D in Fig. 1 and B and C in Figs. 8 and 10, and the parts common to or associated with the respective engines are referred to as a group by reference numerals to which letter exponents are added to indicate individual parts. For example, 6[a] is the propeller of engine A.

Each of the engines, whose speed is to be matched against or synchronized with a selected reference or master speed, is equipped with a speed changer or adjuster movable to different positions to vary the operating speed of the engine. The adjuster may take various forms and operate through the medium of a fuel control throttle or the like. It is shown herein as a rack bar 4 which may be moved as desired to vary the pitch of a propeller 6 driven by the engine and controlling the speed of the latter.

In the embodiment shown in Figs. 1 and 2, the speed change is effected through the intermediary of a governor 5 which operates automatically to maintain a constant engine speed corresponding to the setting of the adjuster 4. The governor shown is of the hydraulic type having a servo motor 7 rotatable with the propeller 6 and actuating the follower 8 of a cam 9 which, through bevel gear connections, turns the propeller blades on their longitudinal axes. In the present instance, the governor includes a rotary head 10 driven in unison with the controlled engine and pivotally supporting flyballs 11, the centrifugal force of which is opposed by and balanced against a compression type speeder spring 12, one end of which bears against an abutment formed by the end 13 of the speed adjusting rack 4. The latter is slidable endwise in a guide 14 formed in the governor casing 15. The other end of the spring 12 engages the head 16 of a control rod 17 which bears against the flyball arms 18. The ball head 10 is on the upper end of a sleeve 19 journaled in the governor casing and driven from its lower end through a gear connection 20 with the engine crankshaft 21.

The control rod 17 actuates a valve 22 regulating the flow of pressure fluid to and from the servo 7 so as to maintain an engine speed corresponding to the governor speed setting. The valve includes a land 23 on the rod cooperating with ports 24 in the sleeve 19 which ports communicate with a conduit 24' constituting the outlet of a booster pump 25. Oil is delivered to the pump from a branch 26 leading from the outlet of a gear pump 27 that supplies oil at low pressure to the engine lubricating system. The pressures developed by the pumps 25 and 27 are determined by the setting of by-pass valves 28 and 29.

The lower end of the valve sleeve 19 may be opened and closed according to the position of a land 30 on the lower end of the stem 17. Intermediate the lands 23 and 30, the sleeve is ported and communicates with a conduit 31 which leads through a suitable collector ring (not shown) to the casing 32 of a distributor valve 33 disposed within the propeller shaft. This valve includes a plunger 34 having lands thereon controlling the covering of ports 35 and 36 leading from the supply line 31, ports 37 and 38 communicating with the outlet of the pump 27, and ports 39 and 40 respectively communicating with the head and rod ends of the servo cylinder 7°. A spring 41 acts on the plunger 31 to maintain the valve in the normal position shown.

As a result of the foregoing arrangement, the parts will be positioned as shown when the engine is operating at the speed corresponding to the governor speeder spring setting. An increase in engine speed raises the pilot valve member 17, uncovering the ports 24 and permitting the flow of pressure fluid to the servo motor through the ports 36 and 40. This forces the piston 7ᶠ outwardly thereby increasing the propeller pitch. Oil from the head end of the cylinder is forced back into the engine lubricating system through the ports 39 and 38. As the engine slows down to the speed determined by the governor, the pilot valve descends to the position shown in Fig. 2, thus shutting off the supply of oil to the servo motor, the pump 25 being relieved through the valve 28. A decrease in engine speed below the governor setting results in lowering of the valve rod, the land 30 opening the lower end of the valve chamber to the drain. As a result, the propeller pitch is reduced. In response to the resulting pick up in engine speed, the governor raises the valve plunger and closes off the drain just as the engine reaches the set speed.

Changes in the speed setting of the governor in accordance with movement of the speed adjuster or rack 4 are effected in the present instance through a pinion 42 on a shaft 43, the pinion meshing with teeth 44 on the exterior of the rack 4 which is in the form of a cup. The shaft 43 is journaled in the governor casing.

Feathering of the propeller to prevent windmilling of a disabled engine may be effected by energizing an electric motor 44ᵃ under manual control to start an auxiliary pump 45 which communicates with the conduit 31 through a pipe 46 and a valve 47 normally closed by a spring 48. This pump, which is supplied from the engine lubricating system, develops a substantially higher pressure than the pump 25. Under this pressure, the cut-off valve 47 is moved to close the conduit 31 and permit the high pressure oil to flow to the servo cylinder through the distributor valve ports 36 and 40. This causes the servo piston to move out through a range in which a steeper cam section 9ᵉ is effective to increase the propeller pitch to a set maximum. With the blades thus feathered, rotation of the engine is stopped and the blades remain at full pitch, the motor 44 being thereafter deenergized before too high a pressure has developed.

To unfeather the propeller, the motor 44 is again started and then permitted to operate until the pump 45 has built up a pressure sufficient to compress the spring 41 of the distributor valve and move the land 48 past the port 39. This connects the engine lubricating system to the rod end of the cylinder through ports 37 and 40 and admits the high pressure oil to the head end of the cylinder through ports 36 and 39. Movement of the piston is thus reversed to reduce the pitch of the blades. The unfeathered propeller is permitted to windmill to a certain speed before the motor 44 is deenergized whereupon the cut-off valve 47 restores the cranked engine to the control of its governor 5 and the spring 41 reconditions the distributor valve for normal operation.

To adjust the individual speeds of the controlled engines, either manually or automatically, the speed adjuster 4 of each engine is moved in the desired direction by an electric actuator controllable from a remote point. In the present instance, the actuator comprises an electric step motor 51 (Fig. 4) incorporated in the governor casing and including a stator 52 carrying three groups of windings 53, 54, and 55 distributed over twelve stator teeth 56 defining poles $a$ to $l$. A permanent magnet rotor 57 has two salient poles with faces of such width that they span five of the stator pole faces and coact therewith to produce a distinct cogging action when the stator is deenergized. Each coil encloses two adjacent stator teeth and is connected in series with a similar coil that encloses one of the same teeth and the next adjacent tooth. Thus, of the four coils 53, one encloses poles $a$ and $b$, a second poles $b$ and $c$, the third poles $g$ and $h$, and the fourth poles $h$ and $i$. All four coils are in series as indicated by the full line 66. The coils 54 are similarly mounted to enclose poles $c, d, e,$ and $i, j, k$ are connected in series as indicated by the dotted line 68. The coils 55 enclose poles $e, f, g,$ and $k, l,$ $a$ and are connected in series as indicated by the dot-dash line 67. To complete a delta form of wiring, one end of the conductor 68 is connected at 68ᵃ to the conductor 66, the corresponding ends of the conductors 66 and 67 being connected at 66ᵃ and 67ᵃ to the conductors 67 and 68 respectively.

By energizing the stator windings from a direct current source selectively in various polarity combinations, the rotor may be caused to assume twelve different well defined angular positions and to turn progressively in either direction by varying the combinations properly. Such excitation is effected in the present instance by a commutator switch 58 comprising three segmental contacts 59 and 60 and 61 carried on the face of an insulating disk 62 fast on a shaft 63 which carries rings 64 engaged by brushes 65. The latter are connected by the conductors 66, 67, and 68 and, therefore, to the windings 53, 54, and 55 of the step motor. The segments are engaged by wiper brushes 69, 70, 71, and 72 angularly spaced as shown in Fig. 3 and mounted on the free ends of spring arms 75 and 76. These arms of the different commutating switches are arranged in pairs respectively connected by conductors 73 and 74 to the positive and negative terminals of a direct current source such as a battery 77 (Fig. 1), manually operable toggle switches 78 being included in the conductors.

When the shaft 63 is disposed as shown in Fig. 3, the windings 55 will be energized through the brushes 69 and 70 and the segment 59 while the opposite terminal of the current source will be connected to the windings 53 through the brushes 71 and 72 and the segment 61, the potential drop across the conductor 68 being zero. With the delta connections, the windings 53 are placed directly across the line and the windings 54 and 55 are in series across the line, and, therefore, the current therein is half that of the coils 53. Accordingly, the flux densities in the different stator poles will be in the ratios of 4 for the teeth $b$ and $h$, 3 for the teeth $a$, $c$, $g$, and $i$, and 2 for the teeth $d$, $f$, $j$, and $l$. The effects of the windings on the teeth $e$ and $k$ cancel each other, so that these teeth are deenergized and the rotor poles are attracted by the other teeth to the well defined position shown.

Now assume that the switch shaft 63 is advanced thirty degrees clockwise as shown in Fig. 4, the contacts 72 and 71 respectively engage the segments 60 and 61 thereby connecting the conductors 66 and 68 to short out the coils 54. The flux densities in the different stator teeth are then zero in teeth $d$ and $j$, 2 in teeth $c$, $e$, $i$, and $k$, and 4 in teeth $a$, $b$, $f$, $g$, $h$, and $i$. The rotor is thus attracted to a position one-twelfth of a revolution in advance of that shown in the drawing. In a similar manner, the energization ratios of the teeth will be varied in different combinations as the switch shaft 63 is advanced in thirty degree steps and the rotor 57 will follow this shaft.

The torque of each step motor is amplified and the motion thereof reduced and applied to the associated speed adjuster 4 in a large ratio such that the speed setting of the adjuster will be changed in a very small increment for each stepping movement of the step motor shaft 80. To this end, the motor torque is transmitted through gearing 81, a shaft 82, and then, in the embodiment shown in Figs. 1 and 2, through a planetary differential 83 to the shaft 43.

The arrangement above described reduces the motion of the step motor in a ratio of about 500 to 1 and operates to lower the rack 4 and increase the speed setting one R. P. M. for each step of movement of the motor shaft 80 in one direction and conversely to effect a similar decrease in motor speed as the shaft turns in the opposite direction.

Means selectively controllable from a remote point is provided for breaking the driving connection between each step motor 51 and the associated speed adjuster 4 for disabling the automatic synchronizing control of the engine and quickly changing the setting of the adjuster to a predetermined value which will provide for safe operation of the engine and aeroplane under special conditions. Actuation of the speed adjuster in this manner is effected herein by a compression spring 87 (Fig. 2) encircling a screw 86 and acting between the rack 4 and the casing 15. This spring is strong enough to overcome the speeder spring 12 and move the speed adjuster 4 in the speed-increasing direction to the predetermined value which, as shown in Fig. 2, may be determined by a stop in the form of a screw 92. The latter threads into the governor casing, and its end is positioned to engage the end of a rack 93 meshing with the pinion 42 and guided in the casing. This rack moves back and forth slowly and idly with the speed adjuster under normal operating conditions. However, when the drive connection with the motor 51 is broken, the force of the auxiliary spring 87 is applied to move the racks 4 and 93 rapidly until the stop 92 is encountered thereby changing the governor speed setting and speeding up the engine quickly.

The differential gearing 83 of each governor constitutes part of a releasable clutch connection for freeing the speed adjuster 4 while providing for reestablishment of the driving relation in the positions to which the parts are moved by the spring 87. Accordingly, the sun gear of the differential is carried by the shaft 82 while the planet gears are on a yoke indicated at 95 and rotatable with the shaft 43. The ring gear 96 meshing with the planet gears is formed externally with ratchet teeth 94 engaged by a pawl 97 pivoted at 98 and acting, when engaged, to hold the ring gear against clockwise turning under the predominating action of the spring 87. This active position of the pawl is normally maintained by a spring 99 acting on an arm 100 which is connected to the armature 101 of a solenoid 102.

When the solenoid is energized, the pawl is retracted, thereby freeing the ring gear for rotation under the influence of the spring 87 until the rack 93 encounters the stop 92. The speed setting of the associated engine speed adjuster is thus increased substantially instantaneously to the value selected by adjustment of the stop 92. On deenergization of the solenoid, the pawl reengages the ratchet under the action of the spring 99 and the connection is restored so that the governor setting may again be decreased by operation of the step motor 51. It will be observed that the clutch 83 is located in the driving train between the speed reduction gearing 81 and the adjusting pinion 42. Thus, the spring 87 always applies a torque to the ring 96 in a direction to hold the active tooth 94 against the latch 97 so that during operation of the motor 51 in the speed-increasing direction, the spring 87 effects the speed adjustment to an extent permitted by the motor operation.

Provision is made for simultaneously energizing all of the solenoids 102 from the remote point of control, usually a panel 113 (see Fig. 6) in the cockpit of the airplane, so as to enable the automatic synchronizing control to be disabled and the speed adjusters 4 of the different engines to be shifted quickly to their preselected settings as previously described. For this purpose, one terminal of each of the solenoids 102$^a$ to 102$^d$ is connected to the battery lead 73 while the other terminals are joined to the lead 74 through a conductor 103 having a manually operable switch 104 interposed therein.

To indicate the instantaneous speed settings of the different engines, instruments 105 are located on the control panel 113. These are so-called ratio meters each adapted to respond accurately to the ratio of two resistances, one of which is variable and comprises a rheostat 106. The system is substantially unaffected by voltage changes. The resistances are connected to the battery leads 73 and 74 by conductors 107 and 108. The movable element 109 of each rheostat is fast on the shaft 43 of the associated governor 5, the angular position of which constitutes a reasonably accurate indication of the prevailing speed setting of the engine in terms of which speed the instrument 105 is calibrated. The control of the speed indicators from the governor adjusting shaft 43 is also an advantage in that the governor may be adjusted when its engine is idling with its throttle retarded and thus conditioned to accelerate up to a preselected speed when the throttle is advanced.

Means is provided for establishing a master or reference speed which is adjustable selectively and against which the speeds of the slave prime movers are matched and brought into synchronism. This reference speed is provided by a power driven unit which may comprise one of the engines (for example, the engine B, Fig. 1) whose speeds are to be synchronized or a separate smaller motor 110 (Fig. 8) preferably electrically driven. In each instance, the master power unit drives a device capable of delivering electrical energy varying in character according to selected changes in the reference speed. Herein, it comprises a generator 111 having its shaft 112 mechanically connected to the master power unit and preferably of the permanent magnet type such, for example, as is shown in Patent No. 2,071,536. It will be apparent that the frequency of the generator output will change directly with changes in the speed of the master power unit.

Similar generators 114ᵃ, 114ᶜ, and 114ᵈ are mounted on and driven by the slave engines A, C, and D. These provide alternating current sources whose frequencies correspond to the prevailing speeds of the respective slave engines.

The speed of each slave engine is compared with the master reference speed by a differential mechanism which may take various forms. In the form shown in Fig. 1, the differentials are of the electrical type comprising three-phase differential motors 115ᵃ, 115ᶜ, and 115ᵈ assigned to the respective slave engines A, C, and D and preferably mounted side by side in a box behind the control panel 113. Each differential motor comprises a three-phase two pole stator having a winding 116 and a three-phase two pole winding 117 on the rotor which is fast on a shaft 122 coupled directly to the shaft 63 of the commutator switch 56 of the corresponding slave engine.

One winding of each differential 115, in this instance, the stator winding 116, is connected through conductors 118 and normally closed switches 119 to the master generator 111. The rotor windings 117ᵃ, 117ᶜ, and 117ᵈ are similarly connected through conductors 120 and normally closed switches 121 therein to the output of the respective slave alternators 114. Thus, it will be apparent that if the two current sources generated by the master alternator and one slave alternator are identical in frequency, as will be the case when the speed of the slave engine exactly matches the master or reference speed, the relation of the currents in the windings 116 and 117 will be the same, and there will be no mechanical movement of the rotor shaft 122 of the differential motor 115.

When the speeds of the master and one controlled engine are different, the frequencies of the currents supplied by the respective generators will differ proportionately and the differential rotor shaft will turn at a rate proportional to this difference and in a direction determined by which frequency is the higher.

Thus, in the case of the control shown in Fig. 1, if the speed of one of the controlled engines, for example A, differs from that of the master engine B, the differential motor 115ᵃ will actuate the commutator switch 58ᵃ causing the step motor 51ᵃ to turn in a direction to adjust the controlled engine governor 5ᵃ and correct for the speed difference. Such automatic adjustment continues until the speed of the engine A again coincides with that of the master engine as evidenced by matching of the frequencies of the alternators 111 and 114ᵃ.

It will be observed that by closing the switch 104, the clutch release magnets 102 on all of the engines will be energized and the automatic synchronizing control be disabled, the speed adjusters of all of the engines being shifted quickly to the predetermined speed settings previously described.

Provision is made for disabling the automatic synchronizing control and for manually changing the speed setting of governors 5 either alone or in unison from remote points of control on the panel 113. To disable the differential motors 115, the movable contacts of the switches 119 and 121 are carried by a common actuating element 123 which is connected to the armature 124 of a solenoid having a winding 125. When this winding is energized, the switches are closed against the action of a spring 126, and the system is adapted for automatic synchronizing control.

The winding 125 is adapted to be energized from the current source 77 by momentary manual closure of a switch 127 interposed in a conductor 128 including a switch 129 and leading to one battery terminal. The winding is connected to the other battery terminal through the conductor 73 and the manually operable toggle switch 78. Thus, the winding 125 will be energized in response to closure of the push button switch 127 at a time when the switches 78 and 129 are closed and the mechanism conditioned for automatic control.

Movement of the switch element 123 to close the switches 119 and 121 when the relay is energized also closes a switch 130 to establish a sealing circuit for holding the winding energized. This circuit extends from the battery through the conductor 73, the winding 125, a conductor 131, normally closed switches 132 and 133, the holding switch 130, a conductor 134, a conductor 128, and the switch 78. The switch 133 is opened by depression of a manually controllable push button on the panel 113 to break the holding circuit for the solenoid and disable the automatic control.

The switch 132 is arranged to be opened by depression of a push button 135 which closes the switch 104 for energizing the magnets 102 of the various engines to provide the emergency speed up previously described. The actuators for the switches 104, 133, and 127 are located on the control panel 113.

The forward end of each differential motor shaft 122 carries a pinion 136 (Fig. 7) connected by a gear 137 with a gear 138 on a shaft 139 which is journaled in and projects through the panel 113. By turning a hand wheel 140 (Figs. 6 and 7), the motor shaft 122 and therefore the commutator switch rotor will be rotated thereby causing the associated step motor 51 to operate in a direction and through a distance corresponding to the rotation of the crank. In this way, the speed setting of any governor 5 may be increased or decreased as desired, most of the parts of the automatic synchronizing control being utilized in providing for such manual adjustment.

Simultaneous manual adjustment of all or any number of the engine speed adjusters 4 is effected by engaging clutches to connect the gears 138 and then turning one of the hand wheels 140. In the present instance, the clutches include gears 141 rotatable on the inner ends of shafts 142 and having knobs 143 which project from the front of the panel 113 and by which the shaft may be shifted axially between two positions maintained by a detent (not shown) which coacts with grooves 144 in the shaft. When each knob 143 is pulled forwardly, the gear 141 is moved into mesh with two idler gears 145 constantly meshing with the gears 138 on opposite sides of the gear 141. The adjacent gears 141 are thus connected. The gear clutches may be disengaged simply by pushing the knob inwardly to the position shown in Fig. 6.

When all three of the knobs 143 are retracted, all of the gears 138 and the differential motor shafts 122 and the shafts 139 will be interconnected. Then, by turning any one of the hand wheels 140, all of the commutator switches 58 will be turned in the same direction and the step motors 51 operated to effect equal changes in the speed settings of the governors 5. The switch 129 controlling the circuit of the solenoid 125 is actuated by movement of one of the knobs 143, being closed normally when the knob is pushed inwardly. When the knob is retracted preparatory to manually changing the engine speeds, the switch is opened thereby deenergizing the winding 125 to disable the automatic control.

Operation of the entire system above described in a multi-motored airplane would be somewhat as follows: First, assume that the control is conditioned for manual operation, that is, the line switch 78 is closed to render the indicators 105 operative, and that the knobs 143 are pushed inwardly to disengage the associated gear clutches. With the engines running idly and their throttles retarded, the hand wheels 140 would be turned individually until the indicators 105 show take-off speed. When ready for the take-off, the throttles (not shown) for the different engines are advanced and the engines will all come up to the speeds for which their governors are set.

After the take-off, the knobs 143 will be pulled forwardly and the governor speed settings decreased simultaneously to the desired cruising speed. Then, the clutches will be disengaged by pressing in the knobs 143 and the automatic control will be rendered operative by closing the switch 127 to energize the winding 125 and thereby cause the closure of the switches 119 and 121. The engines will now become synchronized automatically at the speed of the master engine B. Subsequently, any small changes that may be desirable may be obtained by proper rotation of the hand wheel 140b of the master engine. To make large changes, the manual couplers may be engaged and the speeds of all of the engines changed simultaneously, after which the automatic control would again be restored.

If an emergency is encountered or for any other reason it becomes desirable to make a sudden increase in the speeds of all of the engines, it is simply necessary to close the switch 104 by depressing the button 135. This energizes the solenoids 102 in each of the governors and trips the pawls 97 breaking the drive connections between the step motor drive gears and the speeder adjusters 4. Each speeder spring is thus overcome by the associated spring 87, and the speed adjusters are moved quickly to the speed settings predetermined by the positions of the stops for the individual speed adjusters.

Restoration of the automatic control is effected by opening the switch 104 as a result of which the pawls 97 reengage the ratchet gears and reestablish the connections between the step motors and the speed adjusters. Then the speeds may be reduced to the desired value either by changing the speed setting of the master engine or by engaging the couplers for simultaneous adjustment of all of the governors.

For many aircraft installations, especially where the ability to maneuver rapidly is not essential, sufficiently accurate control of the engine speeds may be achieved without employing a governor, the speed adjuster in such a case acting directly on the engine speed controller which may be a fuel throttle, a pitch changer, or the like. A typical modification of this general character is shown in Figs. 8 and 9 wherein the same reference numerals are applied to the parts common to the control previously described. Two engines B and C are shown, and each is equipped with a servo actuator 146, hydraulically operable in this instance, to change the pitch of the propeller blades 6. The actuator 146 is incorporated in and rotates with the propeller assembly which in turn is carried by and rotates with the engine crankshaft 21 of the prime mover. Through bevel gears 147, the actuator is adapted to turn the blades back and forth to a pitch determined by the position of the movable member 148 of the control valve 149 having lands 150 thereon cooperating with ports in the valve casing 151 which also rotates with the propeller but is shiftable axially. The member 148 is movable parallel to the propeller axis, and its projecting end 152 bears against a nonrotatable plate 153 that is shifted back and forth axially in accordance with changes in the axial positions of the control rack or speed adjuster 4'. For this purpose, slots 154 in the plate 153 coact with pins 155 on a ring 156 having peripheral gear teeth 157 which mesh with teeth on the rack 4'. The pitch adjusting motion of the servo actuator 146 resulting from a change in the position of the rack 4' operates through gears 158 and a pin and slot connection 159 to shift the valve casing 151 relative to the propeller assembly so that the latter follows up the movements of the valve member 148 and interrupts the flow of pressure fluid to or from the servo actuator when the propeller blade pitch has been changed to correspond to the changed position of the control rod 4'.

As in the embodiment previously described, the step motor 51 mounted on each slave engine operates through speed reduction gearing 160 and 161 and a normally engaged clutch 162 to actuate the engine speed adjuster 4'. In this case, the clutch is of the friction type having axially engageable driving and driven elements 163 and 164, one of which rotates with the armature 165 of a stationary magnet 166. There is a small clearance between the armature and the pole faces of the magnet so that the clutch elements are always brought into firm gripping engagement when the magnet is energized. The magnets for both are normally energized from the battery 77 through the switch 104 which, in this instance, is connected to the clutch windings through conductors 167. When this switch is opened, the speed adjusters 4' of both engines move in either direction under the influence of their springs.

In some aircraft installations, it is desirable under special conditions to move the engine speed adjusters 4' to speed settings short of the maximum and corresponding more nearly to normal cruising speed. To this end, each of the control racks 4 is urged in the speed-increasing direction by a compression spring 168 (Figs. 8 and 9) acting against a fixed abutment 169. A second compression spring 170 substantially stronger than the spring 168 acts between the other end of the rack 4' and an abutment 171 which is slidable along an adjustable rod 172 carried by the other end of the rack. A head 173 on this rod limits the extent of motion of the abutment away from the rack. When the abutment 171 is engaging a fixed stop 174 as shown, the control rack is in the desired cruising speed position. It may be moved by the step motor 51 in the speed-decreasing direction, in which case the rod 172 moves through the abutment 171 further compressing the spring 170. Movement in the speed-increasing direction results in compression of the spring 168 and movement of the abutment 171 away from the stop 174. When the rack is displaced in either direction away from the position predetermined by the position of the head 173 and the abutment 171, the rack will be returned quickly to this positively defined position by one of the other springs 168 or 170. Thereafter, re-enerigization of the clutch magnet 166 will reestablish the driving connection. Such motion of the speed adjuster 4' in either direction to the predetermined position is made possible with the friction type clutch shown.

As previously described, the generator 111 which produces alternating current of the reference frequency in the control shown in Fig. 8 is driven by a small adjustable speed electric motor 110 which may be located conveniently near the control panel 113. The direct current motor shown is of the series type directly coupled to the generator and controlled in a well known manner so as to operate at constant speed. Such operation may be obtained by a governor 175 having fly-weights 175ᵃ carried by a spring 175ᵇ on the motor shaft. The governor operates through a pin 176 to actuate a contact 177 co-operating with a contact disk 178 to form a control switch 179. When the motor 110 exceeds the speed selected by the switch setting, the switch is opened and a resistance 180 is interposed in the motor circuit. When the speed falls below the selected value, the switch 179 is closed to short-circuit the resistance and speed up the motor.

The speed at which the motor operates may be varied as desired by turning the knob 181 of a screw 182 to change the position of the contact disk 178. This knob may be on the control panel 113 or in any other convenient location so that by a simple adjustment, the frequency of the generator output may be varied as desired to change the master speed. In response to the current thus generated, the control as a whole operates in the same manner as that shown in Fig. 1 to compare the speeds of the slave engines B and C against that of the master power unit and thus synchronize the engines automatically. Thus, the differential motors 115ᵇ and 115ᶜ are energized from the master alternator 111 and also from the slave alternators 114ᵇ and 114ᶜ, the connections being continuous in this instance. These differential motors drive the shafts 63ᵇ and 63ᶜ and thereby actuate the commutator switches 58ᵇ and 58ᶜ in accordance with deviations of the slave engine speeds from that of the master motor 110.

The commutating switches 58 are connected to the respective step motors 51ᵇ and 51ᶜ by conductors 183 having interposed therein switches 184 and 185 that are actuated by solenoids 186 and 187 and normally closed as shown when the solenoids are deenergized. Thus, the commutating switches operate through the step motors on the slave engines, and as before, actuate the speed adjusters 4ᵇ and 4ᶜ to synchronize these engines automatically at the speed for which the master motor 110 is adjusted to operate.

If desired, electrical means may be provided for enabling the speeds of the slave engines B and C to be adjusted manually either individually or collectively. For this purpose, the solenoids 186 and 187 are first energized to disable the automatic control and at the same time close their other switches 188 and 189 to disconnect the commutating switches 58ᵇ and 58ᶜ and connect one or both of the step motors 51ᵇ and 51ᶜ to an auxiliary commutating switch 58ᵉ, the connections of the latter being through conductors 190. The latter switch is of the same construction as the switches 58ᵇ and 58ᶜ and its shaft 63ᵉ may be driven by a separate electri direct current motor 191 preferably having a permanent magnet stator and reversible by controlling the direction of current flow in its rotor 192. Such energization is effected by a manually operable reversing switch 193 whose actuator 194 is normally maintained in the neutral position shown. So long as the switch 193 is closed in one direction or the other, the auxiliary commutator switch 58ᵉ is driven and the step motors 51 operate at higher speed to increase or decrease the speed settings of the engines.

The energizing circuit for the solenoids 186 and 187 extends from the battery lead 74 through a switch 196 controlled by a solenoid 197, the movable contact 198 of a selector switch 199, one or both stationary contacts 200 and 201 of this switch, conductors 202, the solenoids 186 and 187, and the conductor 167 to the other battery lead 73. The contact 198, which is operable manually by turning a knob 203, is wide enough to engage both contacts 200 and 201 in the central position shown. If the speed of only one engine is to be adjusted, the contact is moved in one way or the other so as to disengage the contact of the engine whose speed setting is not to be changed.

Energization of the solenoid 197 is controlled by a manually operable switch 204, closure of which connects the solenoid winding across the power lines 73 and 74. Such energization also opens a switch 205 which is interposed in conductors 206 that connect the battery lead 74 to one pair of brushes of the commutator switches 58ᵇ and 58ᶜ. Thus, when the switch 204 is closed to energize one or both of the solenoids 186 and 187 and thus disable the automatic synchronizing control, the power supply to both commutating switches 58ᵇ and 58ᶜ is also interrupted thereby disabling the synchronizing control by the commutator switch and step motor whose solenoid 186 or 187 may not have been energized because of the shifted position of the selector switch 199. As a result, the automatic synchronizing control is fully disabled irrespective of which engines are to be adjusted in the subsequent operation of the motor 191 under manual control.

The various manually controlled devices including the actuators for the swtches 78, 104, 193, 199 and 204 and the master speed adjuster 181 would, of course, be arranged compactly on a panel located in the aeroplane cockpit or other convenient place.

Fig. 10 shows a still further modification of the synchronizing control that embodies a mechanical instead of electrical differential for comparing the speeds of the slave engines with the master speed. In this case, the engine speed adjusters 4 are actuated as before by step motors 51ᵇ and 51ᶜ controlled by commutator switches 58ᵇ and 58ᶜ which are, however, mounted on and adjacent the associated engine. The shaft 63 of each switch is driven through a rotary mechanical connection from the intermediate 208 of a differential gearing 209 one terminal element 210 of which is rotated through a direct connection 211 from the associated slave engine. The other differential terminal 212 is driven by a synchronous motor 213 also mounted on the engine and energized by current from the master alternator 111 so as to run at the selected reference speed.

With this arrangement, deviation in the speed of either slave engine from the master speed will result in turning of the intermediate 208 of the differential and corresponding rotation of the commutator switch 58 to effect the necessary correcting speed adjustment through the step motor 51, the same as in the embodiments previously described.

The synchronizing controls above described possess numerous advantages. For example, due to the cogging action produced in the step motors 51 as previously described, the settings of the engine speed adjusters 4 will be maintained against the action of the springs 87 in the event of power failure at the battery or otherwise. The step motor is particularly advantageous in that in synchronizing, its operating speed is proportional to the speed deviation between the master and slave engines so that it may be stalled at the limits of the speed adjusting range without damage. Moreover, the power input upon such stalling is not changed; consequently, it is unnecessary to provide limit switches or the like as in prior synchronizing controls using ordinary electric motors for speed adjustment.

Because the differential motors 115 merely operate the commutator switches 58, they may be of small capacity and light in weight, and the generators 111 and 114 may be of correspondingly small size and weight. The special speed change effected by breaking the step motor connections to the speed adjusters enables the synchronizing action to occur at a rate sufficiently slow to permit of accurate speed matching while at the same time providing a proper safeguard under unusual or special conditions arising in service operation of the aeroplane. In each of the embodiments disclosed, provision is made for making manual speed adjustments independently of the automatic control, that is mechanically with the apparatus shown in Fig. 1 or electrically through the motor 191 and switch 193 in the control of Fig. 8. Manual adjustments of the engine speeds for various purposes may be made quickly and conveniently and with minimum manipulation on the part of the pilot. With the controls shown in Figs. 1 and 8, it will be observed that there are no switches, brushes, slip rings or the like on the engines or directly subject to the vibration thereof, this contributing to trouble free operation of the control. The control shown in Fig. 8 lends itself readily to the maneuvering of an aeroplane by manipulation of the engine throttles, the individual speed adjusters 4 not being influenced by engine speed changes effected by throttle manipulation.

This application is a continuation in part of my copending application Serial No. 426,362, filed January 10, 1942, now abandoned.

I claim as my invention:

1. A control for synchronizing a plurality of power units having, in combination, adjusters controlling the speeds of the respective units and each having a member variably movable to change the speed setting, reversible electric motors each having a disengageable driving connection with one of said members, means associated with the respective members for biasing the speed control member to a predetermined position when the associated driving connection is broken, electromagnetic means controlling the engagement and disengagement of said connections, mechanism automatically responsive to the speeds of said units and controlling the operation of at least one of said motors to synchronize the units, and means separate from said mechanism and operable at will to control the energization of said electromagnetic means and permit said mechanism to be disabled and the speed settings of said members to be changed quickly by the action of said biasing means.

2. A control for synchronizing a plurality of power units having, in combination, devices selectively adjustable to vary the speeds of the respective units, mechanism responsive to speed changes of said units and operable to adjust one of said devices and synchronize said units automatically, means associated with the respective devices and normally tending to change the speed setting thereof to a predetermined value, and manually controllable means for rendering each of said last mentioned means operative to permit the speed settings of all of said devices to be changed quickly to said predetermined value.

3. A control for synchronizing a plurality of power units having, in combination, adjusters controlling the speeds of the respective units and each having a member variably movable to change the speed setting of the associated unit, reversible electric motors each having a disengageable driving connection with one of said members, means associated with the respective adjusters for biasing the speed control member to a predetermined position when the associated driving connection is broken, electromagnets each controlling the engagement and disengagement of one of said connections, mechanism automatically responsive to the speeds of at least one of said units and controlling the operation of said motors to synchronize the units automatically, and manually controllable switch means located at a point of control remote from said power units and operable to control the energization of said electromagnets.

4. A speed control for a plurality of prime movers having, in combination, individual selectively operable adjusters governing the speed of the respective prime movers, individual means biasing the respective adjusters to predetermined speed settings, reversible electric motors each having stator and rotor members and a winding and operable to overcome said biasing means and drive one of said adjusters in opposite directions according to the selective energization of the winding, one of said members being permanently magnetized and attracting the other member to hold the position of the associated adjuster against the biasing means when said motor winding is deenergized, mechanism for controlling the selective energization of said motor windings, and means operable selectively to disable said motors and permit actuation of the associated adjusters by said biasing means.

5. In a control of the character described, the combination of, a speed control member variably movable to different speed settings, a reversible power actuator, a driving connection including differential gearing having a driven intermediate element connected to said member and two terminal elements, one driven by said actuator, an annular series of teeth movable with said other terminal element, a manually controllable pawl engageable with said teeth and normally acting to hold the teeth against movement but releasable to free the second terminal element, and biasing means urging said member to a predetermined position and operable to move the member to such position when said second terminal element is released.

6. In a control of the character described, the combination of, a speed control member variably movable to different speed settings, biasing means urging said member to a predetermined position, a reversible power actuator, speed reducing gearing driven thereby, means providing a disengageable driving connection between said gearing and said member including a normally stationary rotary element releasable to free said member for movement by said biasing means and carrying an annular series of teeth, a latch engageable with said teeth and normally acting to hold said element against turning, and an electromagnet controlling the movement of said latch between active and inactive positions.

7. In a control of the character described, the combination of, a speed control member variably movable to different speed settings, biasing means urging said member to a predetermined position, a reversible power actuator, speed reducing gearing driven thereby, means providing a disengageable driving connection between said gearing and said member including a normally engaged clutch adapted when released to free said member for movement by said biasing means, and manually controllable means governing the engagement and disengagement of said clutch.

8. Mechanism for controlling the speed of a prime mover having, in combination, a speed adjusting member selectively movable to different settings corresponding to speeds desired to be maintained, energy storing means normally biasing said member to a predetermined setting, a reversible electric motor, means providing a disengageable driving connection between said motor and said member and operable by the motor to overcome the biasing means and move said member to said predetermined setting at a limited rate substantially slower than the rate of movement thereof by said biasing means, mechanism for controlling said motor selectively to adjust the setting of said member at said limited rate, and selectively operable electromagnetic means controlling the engagement and disengagement of said driving connection, said energy storing means actuating said member to said predetermined setting upon disengagement of said connection by said electromagnetic means.

9. A control for matching the speed of a controlled power unit with that of a master unit having, in combination, an adjuster associated with said controlled unit and selectively operable to determine the speed thereof automatically in accordance with the adjuster setting, an electric motor having a stator element with a plurality of windings and a rotor element rotatable in response to energization of said windings in different polarity combinations, a speed reducing driving connection between said rotor element and said adjuster operable to vary the speed setting thereof, a source of direct current, a switch located at a point of control remote from said units and operable in different angular positions of its movable member to connect the terminals of said current source to said windings in different combinations and cause speed-increasing or speed-decreasing rotation of said rotor element as determined by the direction of movement of said member, and means acting differentially in response to deviation in the speed of said controlled unit from that of the master unit to actuate said switch and cause said rotor element to turn in a direction to correct for such deviation, one of said motor elements being permanently magnetized and coacting with the other element to produce a cogging action capable of maintaining the speed setting of said adjuster when all of said stator windings are deenergized.

10. A control for matching the speed of a controlled power unit with that of a master unit having, in combination, an adjuster associated with said controlled unit and selectively operable to determine the speed thereof, an electric motor having a stator with a plurality of windings and a rotor operable in response to energization of said windings in different polarity combinations, a driving connection between said rotor and said adjuster operable to vary the speed setting thereof, a source of direct current, a switch having an angularly movable member and operable in a multiplicity of different angular positions of said member to connect the terminals of said current source to said windings in different polarity combinations and cause speed-increasing or speed-decreasing rotation of said rotor as determined by the direction of movement of said member, a differential motor arranged to turn said movable switch member and having windings, and electric generators respectively driven by said master and controlled units and arranged to energize the respective windings of said differential motor and cause said switch member to turn in a direction and at a speed determined by the speed difference between the master and controlled units.

11. A control for matching the speed of a controlled power unit with that of a master unit having, in combination, an adjuster associated with said controlled unit and operable to control the speed thereof according to the position of the adjuster, an electric motor operable with a stepby-step movement to change the speed setting of said adjuster, a commutator switch located at a point of control remote from said units and electrically connected to said step motor to cause speed-increasing or speed-decreasing rotation thereof in response to movements of the movable member of the switch in opposite directions, a differential motor arranged to actuate said movable switch member and having windings, and electric generators respectively driven by said master and controllable units and arranged to energize the respective windings of said differential motor and cause said switch member to turn in a direction and at a speed determined by the speed difference between the master and controlled units.

12. Mechanism for controlling the speed of a prime mover having, in combination, a speed adjusting member selectively movable to different settings corresponding to speeds desired to be maintained, an electric motor including a stator element and a rotor element one having a plurality of windings energizable in different polarity combinations to turn the rotor element, a driving connection between said rotor element and said member including a selectively engageable and disengageable clutch, a source of direct current, a switch having a movable part and operable in different angular positions of the part to connect the terminals of said current source to said windings in different combinations and cause corresponding speed-increasing or speed-decreasing rotation of said rotor element when said clutch is engaged, energy storing means normally biasing said member to a predetermined setting and operable to move the member when said clutch is disengaged, said biasing means being overcome by said motor when said clutch is engaged, mechanism for turning said switch part selectively to adjust the setting of said member, and electromagnetic means controlling the engagement and disengagement of said clutch.

13. Mechanism for controlling the speed of a prime mover having, in combination, a speed adjusting member selectively movable to different settings within a range of speeds desired to be maintained, energy storing means normally biasing said member selectively in one direction or the other toward a predetermined intermediate setting within said range, a reversible electric motor having a rotary driving connection with said member and capable of overcoming the biasing means thereof, said connection including a clutch having coacting rotary elements engageable frictionally in all relative angular positions of the two elements, mechanism for controlling said motor selectively to adjust the setting of said member, and electromagnetic means controlling the operation of said clutch, said energy storing means acting selectively upon release of said clutch to move said member to said intermediate position.

14. Mechanism for controlling the speed of a prime mover having, in combination, a speed adjusting member selectively movable to different positions, energy storing means normally biasing said member to a predetermined position, a reversible electric motor, means providing a releasable driving connection between said motor and said member and operable by the motor, when engaged, to overcome the biasing means and move said member to said predetermined position at a rate substantially slower than the rate of movement thereof by said biasing means, mechanism for controlling said motor selectively to adjust the position of said member, means normally maintaining said driving connection effective, and electromagnetic means normally maintained deenergized and adapted when energized to overcome said maintaining means and release said driving connection whereby to render said energy storing means effective to move said adjusting member to said predetermined position.

15. A control for synchronizing the operation of master and slave power units having, in combination, devices individually adjustable to vary the operating speeds of the respective units, individual power actuators for the respective devices selectively operable under control from a remote point, positive stops for limiting the motions of the respective speed adjusting devices by their actuators in the speed-increasing direction and each adjustable individually to determine the limit speed setting of its associated device, means at said remote point operable selectively to energize the actuators of said master unit and adjust the speed setting of the associated device, means operable to compare the speeds of the master and slave power units and energize the actuator of the slave unit to maintain the slave and master units synchronized, and supplemental control means at said remote point operable to activate all of said actuators simultaneously and cause movement of all of the speed adjusting devices in the speed-increasing direction to limit positions determined by said stops whereby to bring all of said units to corresponding speeds.

16. A control for synchronizing the operation of master and slave power units having, in combination, devices individually and selectively adjustable to vary the speeds of the respective units, mechanism responsive to speed changes of said power units and operable to synchronize said units automatically, stops for positively limiting the motions of the respective speed adjusting devices in the speed-increasing direction, and means manually controllable and operable to override said mechanism and cause movement of all of the speed adjusting devices in the speed-increasing direction until each device encounters its limit stop whereby all of said devices are brought to corresponding speed settings.

17. A control for synchronizing the operation of master and slave power units having, in combination, devices individually adjustable to vary the speeds of the respective power units, individual power actuators for the respective devices selectively operable under control from a remote point, automatically acting control means operable to compare the speeds of the master and slave units and energize the actuator of the slave unit to maintain the slave and master units synchronized, supplemental means controllable electrically from said remote point and operable to activate all of said actuators simultaneously and cause movement of all of the speed adjusting devices in the speed-increasing direction, and means for limiting the last mentioned speed-increasing motion of said devices to a common speed setting.

18. A control for matching the speed of a controlled power unit with that of a master unit having, in combination, an adjuster adapted to be associated with said controlled unit for varying the speed thereof according to the speed of the adjuster, a direct current motor having a rotary rotor element and a plurality of windings energizable in different polarity combinations to turn said rotor through a multiplicity of steps in each revolution, a switch electrically connected to said windings and having a rotary member and operable in each revolution to effect energization of the windings in said polarity combinations, and means for comparing the speeds of the master and controlled power units and turning said switch member at a speed corresponding to the detected speed difference whereby to cause said rotor element to turn at a proportional speed.

GEORGE FORREST DRAKE.

REFERENCES CITED

The following references are of record in the file of this patent:

UNITED STATES PATENTS

| Number | Name | Date |
|---|---|---|
| 1,553,407 | Staege | Sept. 15, 1925 |
| 2,199,640 | Lenehan | May 7, 1940 |
| 2,205,264 | Kalin | June 18, 1940 |
| 2,252,518 | Martin | Aug. 12, 1941 |
| 2,258,462 | Martin | Oct. 7, 1941 |
| 2,264,865 | Taylor | Dec. 2, 1941 |
| 2,264,874 | Day | Dec. 2, 1941 |
| 2,327,341 | Drake | Aug. 24, 1943 |